US012780319B2

(12) United States Patent
Hirano et al.

(10) Patent No.: US 12,780,319 B2
(45) Date of Patent: Nov. 3, 2026

(54) LOWER VEHICLE-BODY STRUCTURE OF VEHICLE

(71) Applicant: MAZDA MOTOR CORPORATION, Hiroshima (JP)

(72) Inventors: Hikari Hirano, Hiroshima (JP); Koji Miyamoto, Hiroshima (JP); Akira Iyoshi, Hiroshima (JP); Eiji Kamemoto, Hiroshima (JP); Ippei Kuroda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 203 days.

(21) Appl. No.: 18/932,313

(22) Filed: Oct. 30, 2024

(65) Prior Publication Data

US 2025/0196928 A1 Jun. 19, 2025

(30) Foreign Application Priority Data

Dec. 14, 2023 (JP) ................................ 2023-211513

(51) Int. Cl.
*B62D 25/02* (2006.01)
*B62D 21/15* (2006.01)
*B62D 27/02* (2006.01)

(52) U.S. Cl.
CPC ........... *B62D 25/025* (2013.01); *B62D 21/15* (2013.01); *B62D 27/02* (2013.01)

(58) Field of Classification Search
CPC ...... B62D 21/02; B62D 21/15; B62D 21/157; B62D 25/025; B62D 27/02
See application file for complete search history.

(56) References Cited

U.S. PATENT DOCUMENTS

2022/0281304 A1 9/2022 Gibeau et al.

FOREIGN PATENT DOCUMENTS

| | | | | |
|---|---|---|---|---|
| FR | 3117987 A1 * | 6/2022 | ........... B62D 25/025 |
| JP | 2022-531463 A | 7/2022 | |
| KR | 101482462 B1 * | 1/2015 | ............ B62D 25/20 |

OTHER PUBLICATIONS

JP-7560807-B2 (Year: 2024).*

* cited by examiner

*Primary Examiner* — Lori Lyjak
(74) *Attorney, Agent, or Firm* — Studebaker Brackett PLLC

(57) ABSTRACT

A lower vehicle-body structure of a vehicle comprises an outer-side reinforcing member and an inner-side reinforcing member inside a side sill. In the side sill, upper-and-lower ridgelines extending in a longitudinal direction are formed between an outer vertical-wall portion and an outer top-plate portion and between the outer vertical-wall portion and an outer bottom-plate portion. The inner-side reinforcing member comprises an engaged portion fixed to the inner vertical-wall portion and configured to engage with the outer-side reinforcing member in a vehicle side collision. The outer-side reinforcing member comprises an engaging portion configured to engage with the engaged portion and at least one of an upper brace portion interconnecting the outer vertical-wall portion and the outer top-plate portion, straddling the upper ridgeline, and a lower brace portion interconnecting the outer vertical-wall portion and the outer bottom-plate portion, straddling the lower ridgeline.

18 Claims, 7 Drawing Sheets

LOWER VEHICLE-BODY STRUCTURE OF VEHICLE

BACKGROUND OF THE INVENTION

The present invention relates to a lower vehicle-body structure of a vehicle.

Various technologies that when an obstacle, such as a pole, collides from a vehicle side, i.e., in a vehicle side collision, a side sill which constitutes a vehicle-side lower portion is so crashed that collision energy can be absorbed are known. In an electric automobile, in particular, since a battery pack is arranged below a floor of the vehicle, it is important from a protection perspective of the battery pack that the energy absorption performance of the side sill is improved properly.

In a structure disclosed in Japanese Patent Laid-Open Publication No. 2022-531463 (US 2022/0281304 A1), an outer-side reinforcing member and an inner-side reinforcing member are provided inside a closed-cross section of a side sill in order to improve an energy-absorption quantity of the side sill. In this structure, the outer-side reinforcing member is fixed to a vertical-wall portion of a side sill outer which is a vehicle-outside portion of the side sill. Likewise, the inner-side reinforcing member is fixed to a vertical-wall portion of a side sill inner which is a vehicle-inside portion of the side sill. The outer-side reinforcing member and the inner-side reinforcing member are configured to contact each other inside the closed-cross section of the side sill.

In the above-described structure, however, since the outer-side reinforcing member is fixed only to the vertical wall which is positioned on a vehicle inside of the side sill, an angle change of a ridgeline (corner portion) which is formed by the vertical-wall portion of the side sill outer and its upper-side horizontal wall (a top-plate portion) or by the vertical-wall portion of the side sill outer and its lower-side horizontal wall (a bottom-plate portion) cannot be suppressed in the vehicle side collision, so that there is a concern that the side sill outer may be deformed such that an angle between the vertical-wall portion and the horizontal wall is changed (opened or closed).

Accordingly, the outer-side reinforcing member is improperly shifted in a vertical direction in the vehicle side collision because of the angle change of the ridgeline of the side sill outer, so that it may be difficult that the outer-side reinforcing member engages with the inner-side reinforcing member stably. Consequently, improving the energy-absorption quantity by the outer-side reinforcing member and the inner-side reinforcing member may become difficult.

Further, according to the above-described structure, even in a normal vehicle traveling, since the angle change of the ridgeline positioned on the vehicle inside of the side sill cannot be suppressed only by the outer-side reinforcing member fixed to the vertical wall, it may be difficult to improve the rigidity of the side sill Moreover, since the outer-side reinforcing member and the inner-side reinforcing member are configured to contact each other inside the closed-cross section of the side sill, there is a concern that a noise may be generated because the outer-side reinforcing member moves vertically according to the slight angle change of the side sill in the normal vehicle traveling.

SUMMARY OF THE INVENTION

The present invention has been devised in view of the above-described matters, and an object of the present invention is to provide a lower vehicle-body structure of a vehicle which can compatibly attain improvement of the quantity of the energy absorption by the side sill in the vehicle side collision and improvement of the rigidity of the side sill in the normal vehicle traveling.

The lower vehicle-body structure of the vehicle of the present invention comprises a side sill having a closed-cross section and extending in a longitudinal direction of the vehicle, an outer-side reinforcing member arranged inside the side sill and extending in the longitudinal direction, and an inner-side reinforcing member arranged on a vehicle inside of the outer-side reinforcing member inside the side sill and extending in the longitudinal direction, wherein the side sill comprises an outer vertical-wall portion, an inner vertical-wall portion positioned on the vehicle inside of the outer vertical-wall portion, an outer top-plate portion connected to an upper end of the outer vertical-wall portion, and an outer bottom-plate portion connected to a lower end of outer vertical-wall portion, the outer vertical-wall portion, the inner vertical-wall portion, the outer top-plate portion and the outer bottom-plate portion form together at least part of the closed-cross section of the side sill, an upper ridgeline is formed between the outer vertical-wall portion and the outer top-plate portion and a lower ridgeling is formed between the outer vertical-wall portion and the outer bottom-plate portion, the inner-side reinforcing member comprises an engaged portion which is fixed to the inner vertical-wall portion and configured to engage with the outer-side reinforcing member when an collision load applied from a vehicle side is inputted to the side sill, and the outer-side reinforcing member comprises an engaging portion which is configured to engage with the engaged portion of the inner-side reinforcing member when the collision load applied from the vehicle side is inputted to the side sill and at least one of an upper brace portion which interconnects the outer vertical-wall portion and the outer top-plate portion, straddling the upper ridgeline, and a lower brace portion which interconnects the outer vertical-wall portion and the outer bottom-plate portion, straddling the lower ridgeline.

According to the present invention, the outer-side reinforcing member and the inner-side reinforcing member are provided inside the side sill. Further, the outer-side reinforcing member comprises the engaging portion which is configured to engage with the engaged portion of the inner-side reinforcing member in the vehicle side collision, i.e., when the collision load applied from the vehicle side is inputted to the side sill, and the brace portion. The brace portion interconnects the outer vertical-wall portion and the outer top-plate portion, straddling the ridgeline of the side sill, or interconnects the outer vertical-wall portion and the outer bottom-plate portion, straddling the ridgeline of the side sill.

According to the present invention, since the angle change of the ridgeline (e.g., the change of the angle of a corner portion of the closed-cross section such that the angle is opened or closed) is suppressed by the brace portion, the engaging portion of the outer-side reinforcing member is suppressed from being shifted in the vertical direction in the vehicle side collision. Accordingly, the engaging portion of the outer-side reinforcing member engages with the engaged portion of the inner-side reinforcing member more stably, so that the outer-side reinforcing member and the inner-side reinforcing member can be sufficiently compressed and deformed. Thereby, the energy-absorption quantity can be improved properly.

Further, since the angle change of the ridgeline can be suppressed by the brace portion in the normal vehicle traveling, the vehicle-body rigidity can be improved as well.

Moreover, even if the outer-side reinforcing member and the inner-side reinforcing member are provided inside the side sill in a state where they contact each other, since the slight angle change of the side sill is not generated in the normal vehicle traveling and also the vertical move of the outer-side reinforcing member according to this change does not occur. Consequently, the noise is not caused improperly.

In the above-described lower vehicle-body structure of the vehicle, it is preferable that one of the engaging portion and the engaged portion has a convex-shaped cross section and extends in the longitudinal direction and the other has a concave-shaped cross section, which corresponds to the convex-shaped cross section, and extends in the longitudinal direction.

According to this structure, the engaging portion and the engaged portion can stably engage with each other through their concave-and-convex portions (i.e., a groove and a protrusion) which extend in the longitudinal direction, respectively. Further, by roll-forming a metal plate, either one of the engaging portion and the engaged portion can be formed in a shape where it has the convex-shaped cross section and continuously extends in the longitudinal direction, and the other one can be formed in a shape where it has the concave-shaped cross section and continuously extends in the longitudinal direction. Thus, their stable engagement can be easily attained.

In the above-described lower vehicle-body structure of the vehicle, it is preferable that the outer-side reinforcing member includes a first portion which has the engaging portion and a second portion which is connected to the first portion and has the brace portion.

According to this structure, the first portion with the engaging portion and the second portion with the brace portion can be separately formed in their respective shapes having their desired and continuous cross sections through the respective roll-forming of the metal plates. Then, by connecting the first portion to the second portion, the outer-side reinforcing member provided with the engaging portion and the brace portion can be easily manufactured.

In the above-described lower vehicle-body structure of the vehicle, it is preferable that the first portion is fixed to the side sill via the second portion.

According to this structure, the collision load inputted to the side sill in the vehicle side collision can be securely transmitted to the first portion via the second portion at the outer-side reinforcing member. Thereby, the load transmission from the brace portion of the second portion to the engaging portion of the first portion can be attained smoothly.

In the above-described lower vehicle-body structure of the vehicle, it is preferable that the first portion comprises an upper wall portion which connects the engaging portion to the second portion and a lower wall portion which is located below the upper wall portion and connects the engaging portion to the second portion, and each of the upper wall portion and the lower wall portion has a deformation promotion to promote deformation partially in a vehicle side collision.

According to this structure, in the vehicle side collision, the engaging portion of the first portion of the outer-side reinforcing member engages with the engaged portion of the inner-side reinforcing member and also the partial deformation of the first portion of the outer-side reinforcing member is promoted at each of the deformation-promotion portions of the upper wall portion and the lower wall portion. Consequently, the energy-absorption quantity of the outer-side reinforcing member can be further improved.

In the above-described lower vehicle-body structure of the vehicle, it is preferable that the first portion is made of a plate member, and the deformation promotion portion is constituted by plural step portions which are formed by partially bending the plate member.

According to this structure, the deformation promotion portion can be formed at each of the upper wall portion and the lower wall portion of the first portion of the outer-side reinforcing member with a simple structure. In the vehicle side collision, the plural step portions are deformed in a folding manner (so-called bellows manner), so that the first portion of the outer-side reinforcing member can be deformed easily. Moreover, the energy-absorption quantity of the outer-side reinforcing member can be easily set and controlled by a shape of the step portion of the first portion.

In the above-described lower vehicle-body structure of the vehicle, it is preferable that the upper brace portion and the lower brace portion are both provided.

According to this structure, the further improvement of the energy-absorption quantity of the side sill in the vehicle side collision and the further improvement of the rigidity of the side sill in the normal vehicle traveling can be attained.

In the above-described lower vehicle-body structure of the vehicle, it is preferable that the outer vertical-wall portion has a bead extending in the longitudinal direction, and the brace portion is fixed to the bead.

According to this structure, since the outer vertical-wall portion of the side sill has the bead extending in the longitudinal direction, the rigidity of the outer vertical-wall portion can be improved. Further, since the brace portion is fixed to the bead which provides the high rigidity, the collision load of the vehicle side collision can be smoothly transmitted to the brace portion of the outer-side reinforcing member from the outer vertical-wall portion of the side sill outer, so that the energy-absorption quantity of the outer-side reinforcing member can be further improved.

In the above-described lower vehicle-body structure of the vehicle, it is preferable that the inner-side reinforcing member and the outer-side reinforcing member are made by roll-forming a metal plate.

According to this structure, the desired cross-section shape can be made easily and with low costs. Further, since the both reinforcing members are formed continuously, this structure is applicable to any vehicles with the different vehicle's entire length, i.e., applicable to any vehicle's body sizes.

Further, since the both reinforcing members made by the roll-forming reinforce the side sill over a long range in the longitudinal direction, even if an obstacle hits against any part, in the longitudinal direction, of the side sill, the superior energy-absorption quantity can be obtained.

In the above-described lower vehicle-body structure of the vehicle, it is preferable that the present lower vehicle-body structure of the vehicle further comprises a cross member extending in a vehicle width direction, wherein the cross member is connected to the inner vertical-wall portion of the side sill in a range which includes an overlapping portion of the inner-side reinforcing member and the side sill in a vertical direction.

According to this structure, the collision load can be effectively received in the vehicle side collision by the cross member which supports the overlapping portion of the inner-side reinforcing member and the side sill from the vehicle inside. Thereby, the energy-absorption quantity of the side sill and the inner-side reinforcing member can be further improved.

As described above, the lower vehicle-body structure of the vehicle of the present invention can compatibly attain the improvement of the quantity of the energy absorption by the side sill in the vehicle side collision and the improvement of the rigidity of the side sill in the normal vehicle traveling.

The present invention will become apparent from the following description which refers to the accompanying drawings.

DETAILED DESCRIPTION OF THE INVENTION

Figure 1:
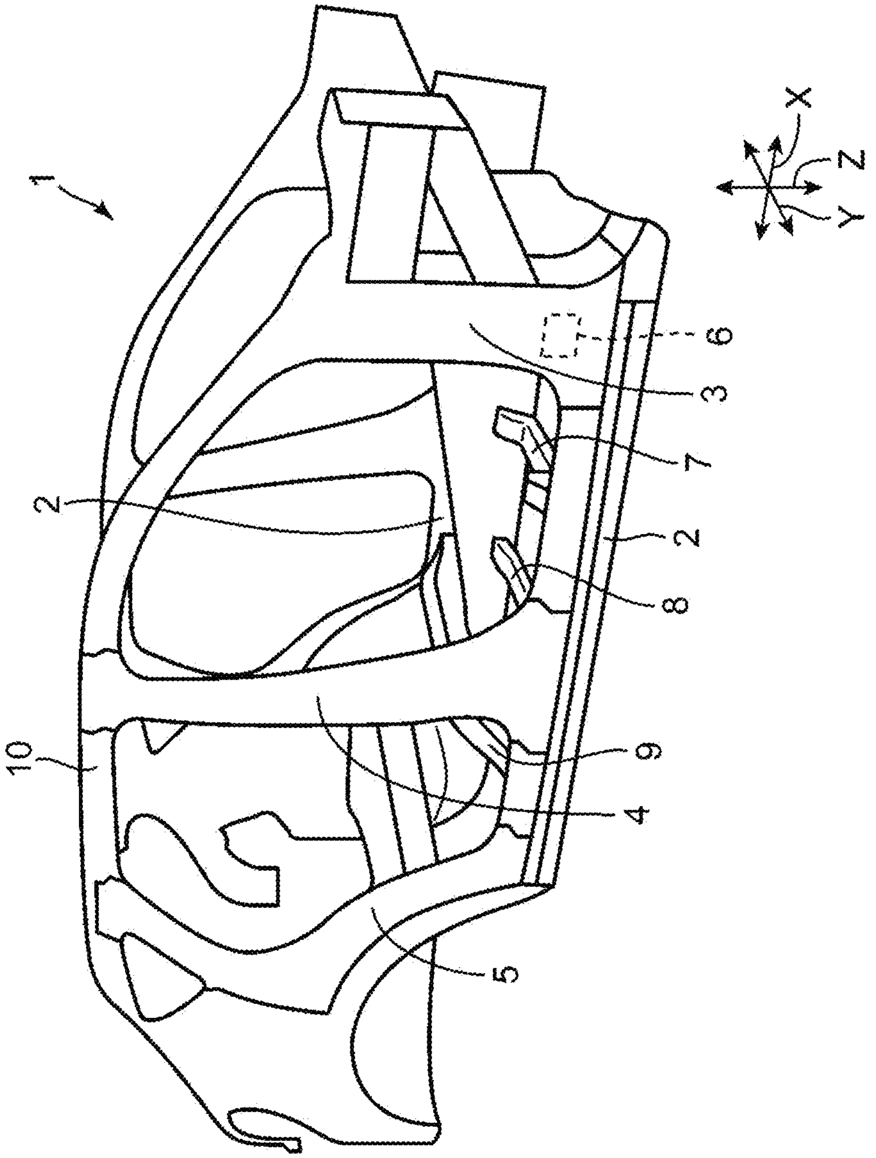
FIG. 1 is a perspective view showing a whole structure of a vehicle body to which a lower vehicle-body structure of a vehicle according to an embodiment of the present invention is applied.

Hereafter, a lower vehicle-body structure of a vehicle according to an embodiment of the present invention will be described specifically referring to the drawings.

Figure 2:
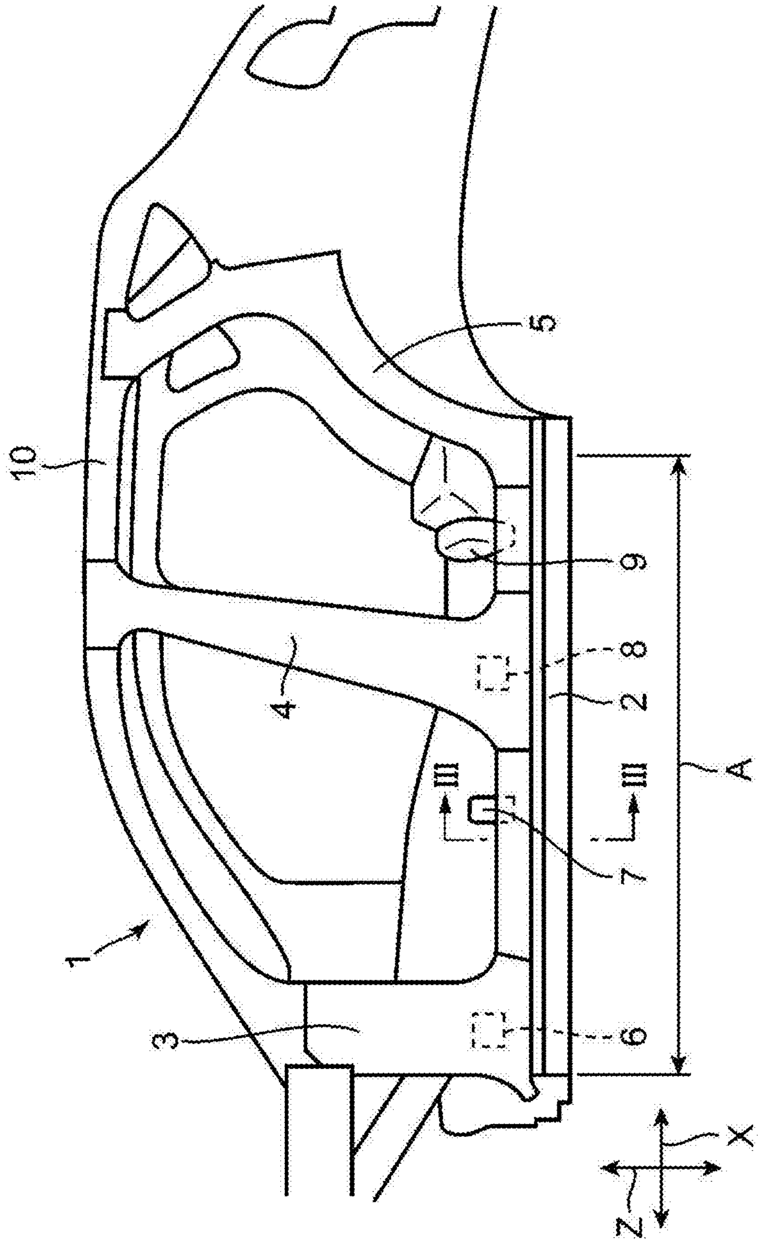
FIG. 2 is a left-side side view of the vehicle body of FIG. 1.

As shown in FIGS. 1 and 2, a vehicle body 1, to which the lower vehicle-body structure of the vehicle according to the embodiment of the present invention is applied, comprises a side sill 2 which constitutes a lower side part of the vehicle body 1 at each of both sides, in a vehicle width direction Y, thereof. In the following figures, a longitudinal direction of the vehicle is shown by an arrow X, a vehicle width direction is shown by an arrow Y, and a vertical direction is shown by an arrow Z.

Specifically, the vehicle body 1 comprises a pair of side sills 2 extending in the vehicle longitudinal direction X, a front pillar 3 (A pillar) extending upward from each front-side end portion of the side sills 2, a center pillar 4 (B pillar) extending upward at a middle position, in the longitudinal direction X, of each of the side sills 2, a rear pillar 5 (C pillar) extending upward from around a rear-side end portion of each of the side sills 2, a roof rail 10 extending in the longitudinal direction X and connecting each upper-end portion of the three pillars 3-5, and four cross members 6-9 (a first cross member 6, a front-side middle cross member 7, a second cross member 8, and a third cross member 9) respectively extending in the vehicle width direction Y between the pair of side sills 2 and interconnecting the pair of side sills 2.

The side sill 2, the three pillars 3-5, and the roof rail 10 form a side part of a vehicle frame.

Further, the four cross members 6-9 are provided to be separated from each other in the longitudinal direction X. The four cross members 6-9 are respectively connected to an inner vertical-wall portion 12*a* of each side sill inner 12 of the side sills 2 in a range including an overlapping portion of an inner-side reinforcing member 14, described later, and the side sill 2 in the vertical direction Z, like the front-side middle cross member 7 shown in FIG. 3. Further, the first cross member 6 and the second cross member 8 are connected to the side sill 2 in a range corresponding to respective connecting portions of the front pillar 3 and the center pillar 4 to the side sill 2.

Figure 3:
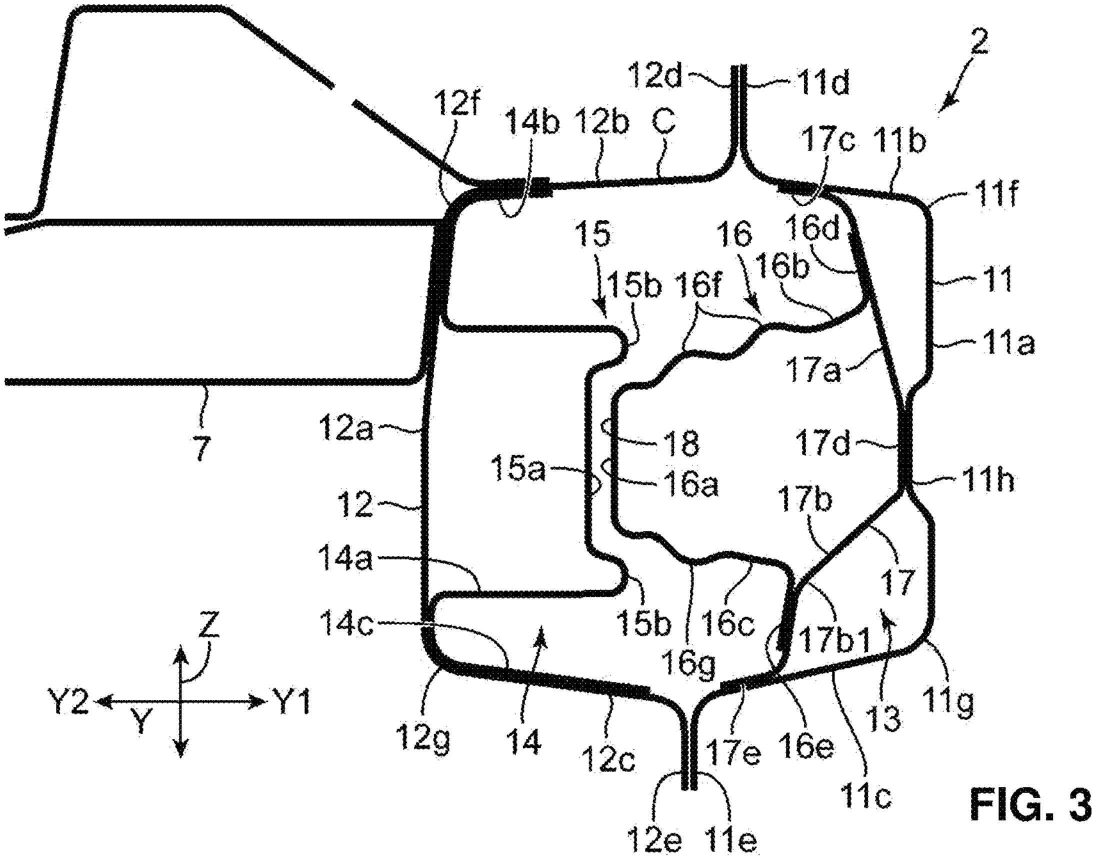
FIG. 3 is a sectional view taken along line III-III of FIG. 2, which shows an outer-side reinforcing member having an engaging portion with a large convex-shaped cross section and an inner-side reinforcing member having an engaged portion with a large concave-shaped cross section.

As shown in FIG. 3, two reinforcing members, i.e., an outer-side reinforcing member 13 and the inner-side reinforcing member 14 are fixed to an inner face of the side sill 2. The outer-side reinforcing member 13 and the inner-side reinforcing member 14 are arranged inside the side sill 2 and extend in the longitudinal direction X, respectively. The inner-side reinforcing member 14 is arranged on a vehicle inside, i.e., on an inside Y2, in the vehicle width direction Y, of the outer-side reinforcing member 13.

Hereafter, the side sill 2 and the outer-side reinforcing member 13 and the inner-side reinforcing member 14, which are positioned inside of the side sill 2, will be described specifically.

Description of Side Sill 2

As shown in FIG. 3, the side sill 2 is a hollow cylindrical body extending in the longitudinal direction X of the vehicle. The side sill 2 is constituted by two members having a hat-shaped cross section, i.e., a side sill outer 11 and a side sill inner 12. The side sill 2 has a substantially rectangular closed-cross section C. The side sill 2 is made by joining a pair of upper-and-lower flange portions 11*d*, 11*e* of the side sill outer 11 and a pair of upper-and-lower flange portions 12*d*, 12*e* of the side sill inner 12.

The side sill outer 11 comprises an outer vertical-wall portion 11*a*, an outer top-plate portion 11*b*, an outer bottom-plate portion 11*c*, an upper flange portion 11*d*, and a lower flange portion 11*e*.

The outer vertical-wall portion 11*a*, which is a flat plate-shaped portion facing outward in the vehicle width direction Y, extends in the vehicle longitudinal direction X. The outer top-plate portion 11*b* is a flat plate-shaped portion which is connected to an upper end of the outer vertical-wall portion 11*a* at its one end (an end portion on a vehicle outside Y1) and faces upward. The outer bottom-plate portion 11*c* is a flat plate-shaped portion which is connected to a lower end of the outer vertical-wall portion 11*a* at its one end (an end portion on the vehicle outside Y1) and faces downward. The outer top-plate portion 11*b* and the outer bottom-plate portion 11*c* extend substantially horizontally, respectively, and are slightly inclined toward a direction away from each other as they approach the side sill inner 12.

The upper flange portion 11*d* is a flat plate-shaped portion extending upward from the other end of the outer top-plate portion 11*b* (an end portion positioned on a vehicle inside Y2). The lower flange portion 11*e* is a flat plate-shaped portion extending downward from the other end of the outer bottom-plate portion 11*c* (an end portion positioned on the vehicle inside Y2).

Ridgelines 11*f*, 11*g* extending in the longitudinal direction X (i.e., corner portions of the closed-cross section C which are positioned on the vehicle outside Y1) are respectively formed between the outer vertical-wall portion 11*a* and the outer top-plate portion 11*b* and between the outer vertical-wall portion 11*a* and the outer bottom-plate portion 11*c*. That is, the ridgeline 11*f* (in other words, the upper-side ridgeline 11*f* or the first ridgeline 11*f*) is formed between the outer vertical-wall portion 11*a* and the outer top-plate portion 11*b*. Meanwhile, the ridgeline 11*g* (in other words, the lower-side ridgeline 11*g* or the second ridgeline 11*g*) is formed between the outer vertical-wall portion 11*a* and the outer bottom-plate portion 11*c*, and arranged below the ridgeline 11*f*.

The outer vertical-wall portion 11*a* has a bead 11*h* extending in the longitudinal direction X (a recess portion which is recessed to the vehicle inside Y2 in FIG. 3).

The side sill inner 12 is arranged on the vehicle inside Y2 of the side sill outer 11. The side sill inner 12 comprises an inner vertical-wall portion 12*a*, an inner top-plate portion 12*b*, an inner bottom-plate portion 12*c*, an upper flange portion 12*d*, and a lower flange portion 12*e*.

The inner vertical-wall portion 12*a* is a flat plate-shaped portion extending in the vehicle longitudinal direction X which is positioned on the vehicle inside of the outer vertical-wall portion 11*a* and faces the vehicle outside Y1. The inner top-plate portion 12*b* is a flat plate-shaped portion which is connected to an upper end of the inner vertical-wall portion 12*a* at its one end (its end portion positioned on the vehicle inside Y2) and faces upward. The inner bottom-plate portion 12*c* is a flat plate-shaped portion which is connected to a lower end of the inner vertical-wall portion 12*a* at its one end (its end portion positioned on the vehicle inside Y2) and faces downward. The inner top-plate portion 12*b* and the inner bottom-plate portion 12*c* extend substantially horizontally, respectively, and are slightly inclined toward a direction away from each other as they approach the side sill outer 11.

The upper flange portion 12*d* is a flat plate-shaped portion which extends upward from the other end of the inner top-plate 12*b* (its end portion positioned on the vehicle outside Y1). The lower flange portion 12*e* is a flat plate-shaped portion which extends downward from the other end of the inner bottom-plate 12*c* (its end portion positioned on the vehicle outside Y1).

Ridgelines 12*f*, 12*g* extending in the longitudinal direction X (i.e., corner portions of the closed-cross section C which are positioned on the vehicle inside Y2) are respectively formed between the inner vertical-wall portion 12*a* and the inner top-plate portion 12*b* and between the inner vertical-wall portion 12*a* and the inner bottom-plate portion 12*c*.

The closed-cross section C of the side sill 2 is formed in a roughly rectangular shape by the above-described six flat plate-shaped portions, i.e., the outer vertical-wall portion 11*a*, the inner vertical-wall portion 12*a*, the outer top-plate portion 11*b*, the outer bottom-plate portion 11*c*, the inner top-plate portion 12*b*, and the inner bottom-plate portion 12*c*. Accordingly, the outer vertical-wall portion 11*a*, the inner vertical-wall portion 12*a*, the outer top-plate portion 11*b*, and the outer bottom-plate portion 11*c* form part of the closed-cross section C. Herein, in a case where the inner vertical-wall portion 12*a* of the side sill inner 12 is so curved that it has a semicircular cross section, the inner top-plate portion 12*b* and the inner bottom-plate portion 12*c* may be unnecessary.

Descriptions of Outer-Side Reinforcing Member 13 and Inner-Side Reinforcing Member 14

The inner-side reinforcing member 14 and the outer-side reinforcing member 13 which are shown in FIG. 3 are made by roll-forming a metal plate. This roll forming is a continuous forming process to make a member having a desired cross section by supplying a plate between a pair or plural-pairs of rollers and pressing it from its both faces.

The inner-side reinforcing member 14 shown in FIG. 3 is fixed to the inner vertical-wall portion 12*a*, and has an engaged portion 15 with which an engaging portion 18 of the outer-side reinforcing member 13 engages when a collision load applied from the vehicle side is inputted to the side sill 2. Herein, details of the engaged portion 15 will be described later.

The inner-side reinforcing member 14 has a hat-shaped cross section, and specifically, comprises a body portion 14*a* which has a roughly U-letter shaped cross section with the engaged portion 15, an upper flange portion 14*b* which extends upward from an end portion of an upper wall portion of the body portion 14*a* and is joined to the inner vertical-wall portion 12*a* and the inner top-plate portion 12*b*, and a lower flange portion 14*c* which extends downward from an end portion of a lower wall portion of the body portion 14*a* and are joined to the inner vertical-wall portion 12*a* and the inner bottom-plate portion 12*c* of the side sill inner 12.

The upper flange portion 14*b* and the lower flange portion 14*c* of the inner-side reinforcing member 14 are joined to the inner vertical-wall portion 12*a*, the inner top-plate portion 12*b*, and the inner bottom-plate portion 12*c* of the side sill inner 12 by spot welding or the like, respectively. Thereby, an angle change of the ridgelines 12*f*, 12*g* (corner portions) of the side sill inner 12 can be suppressed.

It may be enough that the outer-side reinforcing member 13 includes the engaging portion 18 to engage with the engaged portion 15 of the inner-side reinforcing member 14 and brace portions 17*a*, 17*b*.

Specifically, the outer-side reinforcing member 13 shown in FIG. 3 includes a first portion 16 which has the engaging portion 18 and a second portion 17 which is connected to the first portion 16 and has the brace portions 17*a*, 17*b*. The first portion 16 and the second portion 17 are separately made through the roll-forming process of the metal plate, and then joined together by welding or the like. The first portion 16 is fixed to the side sill outer 11 via the second portion 17.

Specifically, the first portion 16 comprises a tip-end face 16*a* which extends in the vertical direction Z as a main part of the engaging portion 18, an upper wall portion 16*b* which connects an upper end of the tip-end face 16*a* to the brace portions 17*a*, 17*b* of the second portion 17, and a lower wall portion 16*c* which is positioned below the upper wall portion 16*b* and connects a lower end of the tip-end face 16*a* to the brace portions 17*a*, 17*b* of the second portion 17.

The upper wall portion 16*b* and the lower wall portion 16*c* have step portions 16*f*, 16*g* as a deformation promotion portion to promote deformation partially in the vehicle side collision.

Since the first member 16 shown in FIG. 3 is made of the plate member, the deformation promotion portion is constituted by the plural step portions 16*f*, 16*g* which are formed by partially bending (includes curving) the plate member in the example in FIG. 3. The step portions 16*f*, 16*g* shown in FIG. 3 are beads or concave-convex portions (unevenness portions) which extend in the longitudinal direction X.

Hereafter, the engaging portion 18 and the engaged portion 15 will be described specifically.

Descriptions of Engaging Portion 18 and Engaged Portion 15

The engaging portion 18 is configured to engage with the engaged portion 15 of the inner-side reinforcing member 14 when the collision load applied from the vehicle side is inputted to the side sill 2. Herein, while the engaging portion 18 shown in FIG. 3 is separated from the engaged portion 15 before application of the collision load in the vehicle side collision, it may contact the engaged portion 15.

The engaging portion 18 and the engaged portion 15 are preferably configured such that one of these has a convex-shaped cross section and extends in the longitudinal direction X and the other has a concave-shaped cross section which corresponds to the above-described convex-shaped cross section and extends in the longitudinal direction X.

For example, according to the engaging portion 18 and the engaged portion 15 of FIG. 3, the relatively large convex-shaped engaging portion 18 is formed by the tip-end face 16*a* and respective connection portions of the upper wall portion 16*b* and the lower wall portion 16*c* to this tip-end face 16*a* of the first portion 16 of the outer-side reinforcing member 13. Meanwhile, the relatively large concave-shaped engaged portion 15 is formed by a tip-end portion 15*a* and a pair of protrusions (projections) 15*b* which protrude to the vehicle outside Y1 from upper-and-lower both ends of the tip-end portion 15*a*, which corresponds to the engaging portion 18.

As shown in FIGS. 6A-6D, when the vehicle side collision happens and the collision load is inputted, the engaging portion 18 comes to engage with the engaged portion 15, and the outer-side reinforcing member 13 and the inner-side reinforcing member 14 start to crash together. Herein, it can be expected that the engaging portion 18 may not improperly move downwardly, so that the inputted collision load can be received by the outer-side reinforcing member 13 and the inner-side reinforcing member 14 properly and stably in all directions (the vehicle width direction Y, the longitudinal direction X, the vertical direction Z, a torsional direction around an X axis extending in the longitudinal direction, and so on). Thereby, the side sill 2 can be suppressed from being bent and deformed to the vehicle inside Y2 in the vehicle side collision. Accordingly, in a vehicle structure in which a battery is loaded on the vehicle inside Y2 of the side sill 2, this battery can be protected securely.

Meanwhile, in a case of a comparative example shown in FIGS. 7A-7D, in which the outer-side reinforcing member 13 and the inner-side reinforcing member 14 do not have any engaging portion and engaged portion, it is apparent that since the first portion 16 of the outer-side reinforcing member 13 is shifted (moved) downward, the collision load may not be stably received by the outer-side reinforcing member 13 and the inner-side reinforcing member 14.

Figure 4:
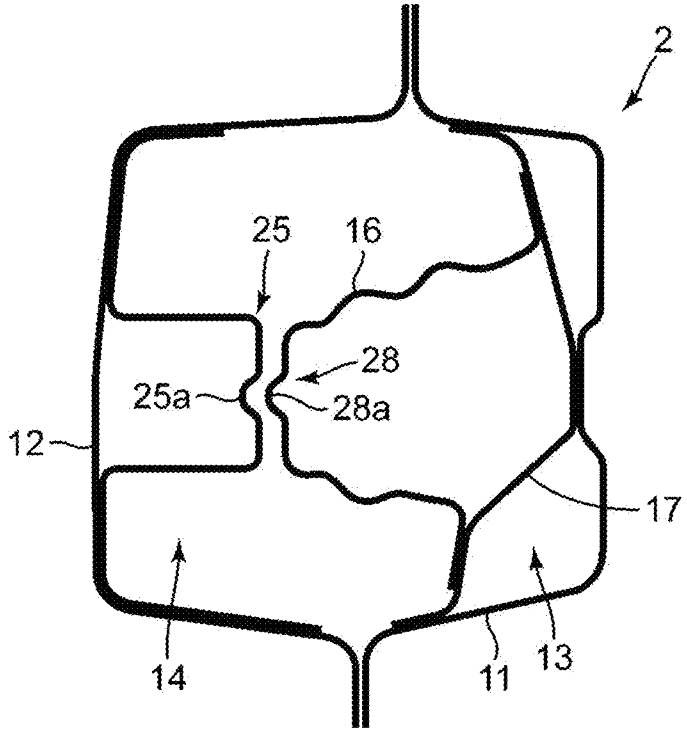
FIG. 4 is a sectional view of a modified example of the present invention, which comprises an outer-side reinforcing member having an engaging portion with a small convex-shaped cross section and an inner-side reinforcing member having an engaged portion with a small concave-shaped cross section.

Herein, even in a case shown in FIG. 4 where an engaging portion 28 with a small convex portion 28*a* and an engaged portion 25 with a small concave portion 25*a* are combined, the above-described shifting between the outer-side reinforcing member 13 and the inner-side reinforcing member 14 can be suppressed by the concave-and-convex engaging. Further, even in another case shown in FIG. 5 where an engaging portion 38 with a small convex portion 38*a* and an engaged portion 35 with a small concave portion 35*a* capable of engaging with the concave portion 38*a* and a lower convex portion 35*b* to receive a lower corner portion of the engaged portion 38 are combined, the shifting between the outer-side reinforcing member 13 and the inner-side reinforcing member 14 can be suppressed by the concave-and-convex engaging as well. Moreover, even in another case of the engaging portions 28, 38 and the engaged portions 25, 35 which are combination of the small concave-and-convex shapes shown in FIGS. 4 and 5, since the outer-side reinforcing member 13 has the brace portions 17*a*, 17*b* as shown in FIG. 3, the properly stable engaging can be attained.

Figure 5:
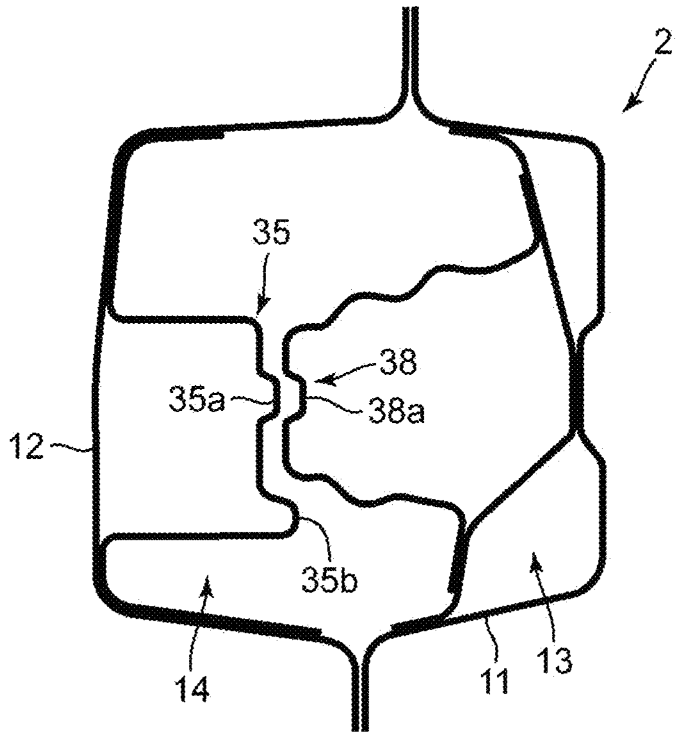
FIG. 5 is a sectional view of another modified example of the present invention, which comprises an outer-side reinforcing member having an engaging portion with a small concave-shaped cross section and an inner-side reinforcing member having an engaged portion with a cross section having two small convex portions.
Figure 6A:
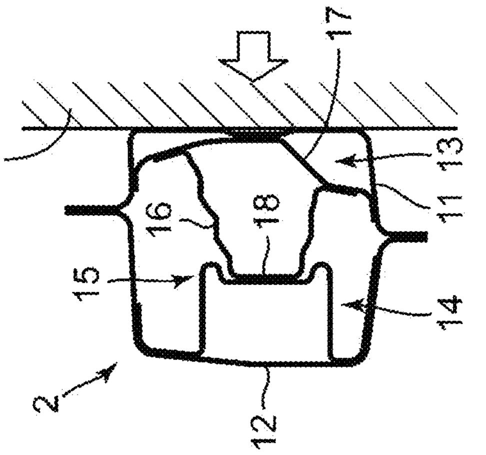
FIGS. 6A-6D are explanatory sectional diagrams showing a crashing process of the present embodiment, in which a side sill and the outer-side reinforcing members and the inner-side reinforcing member, which are provided inside the side sill and shown in FIG. 3, are crashed in a vehicle side collision.
Figure 6B:
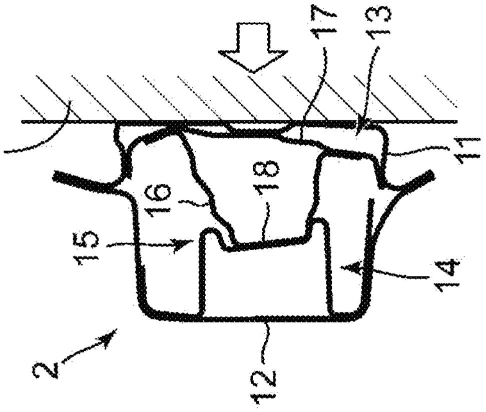
Figure 6C:
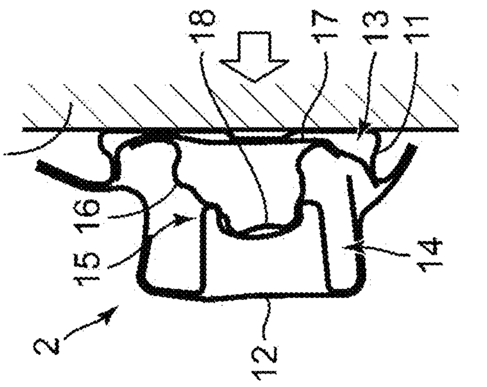
Figure 6D:
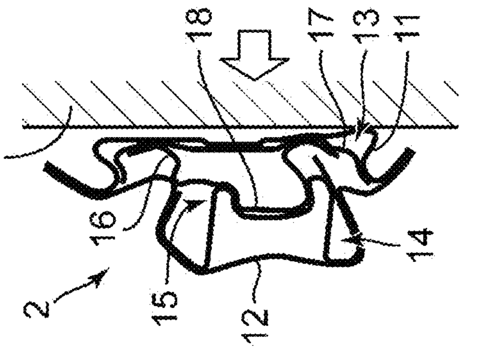
Figure 7D:
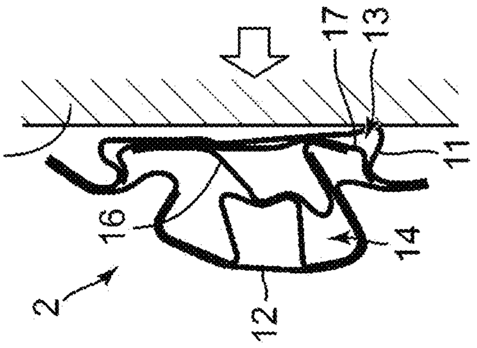
FIGS. 7A-7D are explanatory sectional diagrams showing a crashing process of a comparative example, in which a side sill and an outer-side reinforcing member and an inner-side reinforcing member, which do not have an engaging portion and an engaged portion, are crashed in the vehicle side collision.
Figure 7C:
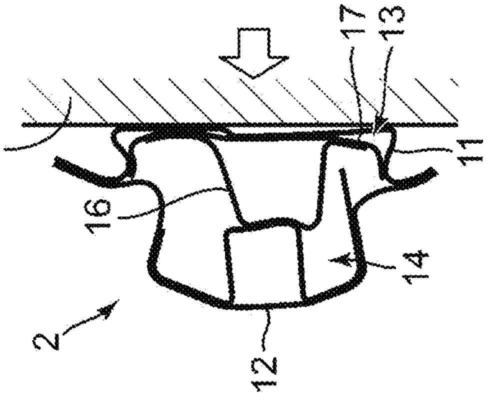
Figure 7B:
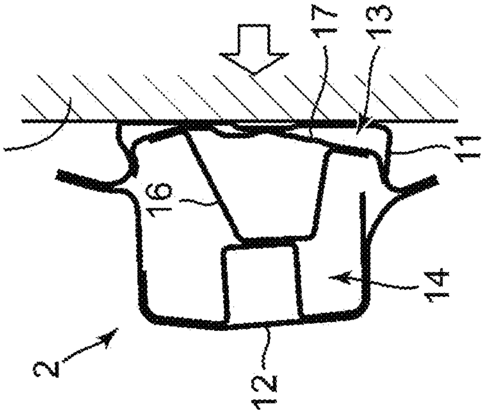
Figure 7A:
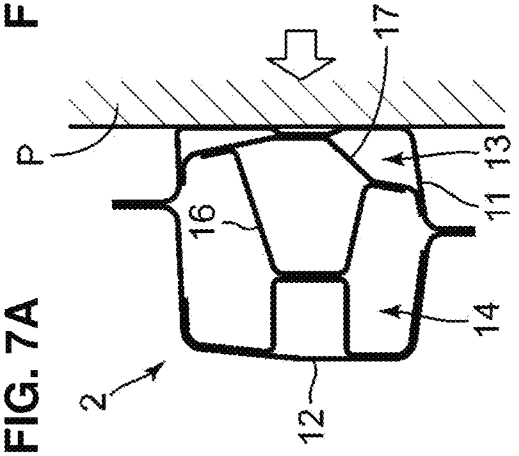

The above-described engaging portions 18, 28, 38 and engaged portions 15, 25, 35 which have the concave-and-convex shaped cross section and extend in the longitudinal direction X shown in FIGS. 3-5 can be continuously formed easily by the roll-forming process of the metal plate.

Next, the second portion 17 with the brace portions 17*a*, 17*b* will be described specifically.

Description of Second Portion 17 with Brace Portions 17*a*, 17*b*

As shown in FIGS. 3, the second portion 17 is the member which is continuously formed by the roll-forming process of the metal plate, and has a curved shape or a V-letter shape with an obtuse angle as a whole. Specifically, the second portion 17 comprises a pair of upper-and-lower brace portions 17*a*, 17*b* and three fixation plate portions 17*c*, 17*d*, 17*e* (the upper-side fixation plate portion 17*c*, the middle fixation plate portion 17*d*, the lower-side fixation plate portion 17*e*) which are separated from each other in the vertical direction Z.

The brace portions 17*a*, 17*b* interconnect the outer vertical-wall portion 11*a* and the outer top-plate portion 11*b* and/or the outer vertical-wall portion 11*a* and the outer bottom-plate portion 11*c*, straddling the ridgelines 11*f*, 11*g* (preferably, interconnect those linearly by welding). Herein, either one of these brace portions 17*a*, 17*b* may be omitted.

In the present embodiment, the brace portions 17*a*, 17*b* interconnect the outer vertical-wall portion 11*a* and the outer top-plate portion 11*b* and also the outer vertical-wall portion 11*a* and the outer bottom-plate portion 11*c*, straddling the ridgelines 11*f*, 11*g*. The brace portions 17*a*, 17*b* can suppress the angle change of the ridgelines 11*f*, 11*g* of the side sill outer 11 in the vehicle side collision.

Herein, the angle change means that the angle of the ridgelines 11*f*, 11*g* of the closed-cross section C of FIG. 3 is opened or closed, and, in some case, that the side sill outer is twisted around the X axis extending in the longitudinal direction X.

Specifically, the upper-side brace portion 17*a* extends obliquely upward-and-inward (the vehicle inside Y2) so as to interconnect the outer top-plate portion 11*b* and the outer vertical-wall portion 11*a* of the side sill outer 11, straddling the upper-side ridgeline 11*f*. An upper end of the upper-side brace portion 17*a* is connected to the upper-side fixation plate portion 17*c*. The upper-side fixation plate portion 17*c* is joined to the outer top-plate portion 11*b* by welding or the like. A lower end of the upper-side brace portion 17*a* is connected to the middle fixation plate portion 17*d*. The middle fixation plate portion 17*d* is joined to the bead 11*h* extending in the longitudinal direction of the outer vertical-wall portion 11*a* by welding or the like.

Further, the lower-side brace portion 17*b* extends obliquely downward-and-inward (the vehicle inside Y2) so as to interconnect the outer bottom-plate portion 11*c* and the outer vertical-wall portion 11*a* of the side sill outer 11, straddling the lower-side ridgeline 11*g*. A lower end of the lower-side brace portion 17*b* is connected to the lower-side fixation plate portion 17*e*. The lower-side fixation plate portion 17*e* is joined to the outer bottom-plate portion 11*c* by welding or the like. An upper end of the lower-side brace portion 17*b* is connected to the middle fixation plate portion 17*d* joined to the bead 11*h*.

Thus, the brace portions 17*a*, 17*b* shown in FIG. 3 are fixed to the bead 11*h* of the outer vertical-wall portion 11*a* of the side sill outer 11 via the middle fixation plate portion 17*d*.

Effects Verification of Brace Portions 17*a*, 17*b*

Next, the verified effects of improvement of the torsional rigidity by means of the above-described brace portions 17*a*, 17*b* will be described.

Figure 8:
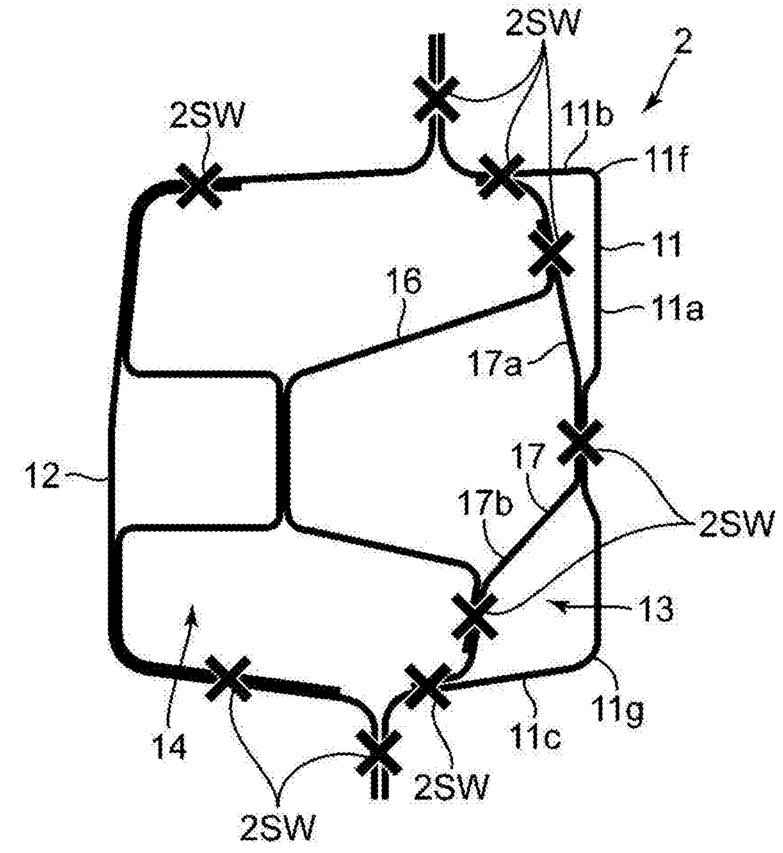
FIG. 8 is an explanatory sectional diagram showing welding points of two-sheet welding of the side sill and the outer-side reinforcing member and the inner-side reinforcing member according to the comparative example shown in FIGS. 7A-7D.

For the effects verification of the brace portions 17*a*, 17*b*, a test model in which a pair of upper-and-lower brace portions 17*a*, 17*b* shown in FIG. 8 are provided was considered. The model shown in FIG. 8, in which the outer-side reinforcing member 13 and the inner-side reinforcing member 14 have do not have any engaging portion nor engaged portion like the comparative example shown in FIG. 7, has a structure in which the second portion 17 of the outer-side reinforcing member 13 has a pair of upper-and-lower brace portions 17*a*, 17*b*. The other structure is the same as that shown in FIG. 3. A reference character 2SW shown in FIG. 8 shows points where two-sheet spot welding is applied.

Figure 9:
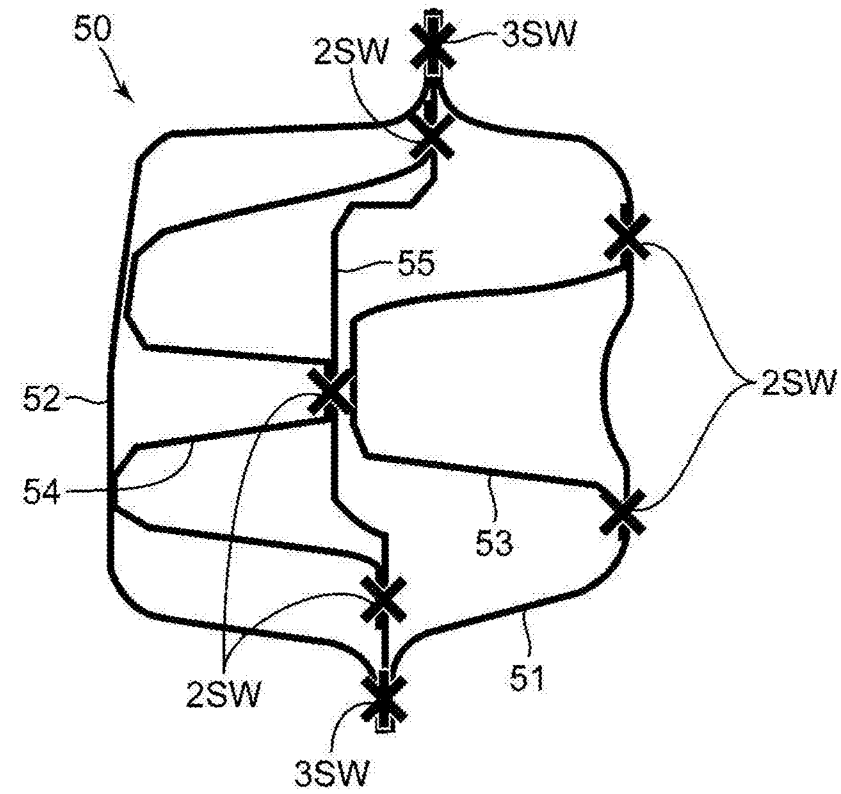
FIG. 9 is an explanatory sectional diagram showing welding points of two-sheet welding and three-sheet welding of a side sill and an outer-side reinforcing member and an inner-side reinforcing member according to a conventional structure as another comparative example.

Meanwhile, a conventional structure shown in FIG. 9 was considered as a comparative example for the above-described test model of FIG. 8. This conventional structure corresponds to the structure disclosed in the above-described patent document in which no brace portion is provided. In the structure shown in FIG. 9, an outer-side reinforcing member 53, an inner-side reinforcing member 54, and a partition member 55 are arranged inside a side sill 50. A side sill outer 51 and a side sill inner 52 of the side sill 50 and the partition member 55 are joined together by three-sheet spot welding at two points 3SW of upper-and-lower flange portions. The other portions are two-sheet spot-welded at the two points 2SW. That is, while the outer-side reinforcing member 53 is welded to a vertical wall portion 51*a* of the side sill outer 51, the inner-side reinforcing member 54 is welded to the partition member 55, not to the side sill inner 52.

According to the structure having the brace portions 17*a*, 17*b* shown in FIG. 8, when the collision load is applied, the angle change of the ridgelines 11*f*, 11*g* can be suppressed by the brace portions 17*a*, 17*b*. Therefore, in the verification test that a torsional moment around the axis X extending in the longitudinal direction X was applied to the test model shown in FIG. 8, the torsional rigidity of about 110,000 N/rad was measured, and the mass efficiency was about 40,000 N/rad·kg.

Meanwhile, since the conventional structure shown in FIG. 9 does not have any brace portion, the angle change of the ridgelines of the side sill 50 cannot be suppressed. Therefore, in the verification test that the torsional moment around the axis X was applied to the conventional structure shown in FIG. 9, the torsional rigidity measured was just about 92,000 N/rad, and the mass efficiency was about 30,800 N/rad·kg. Thus, the test showed that the mass efficiency of the conventional structure was only about 77% of that of the structure having the brace portions 17*a*, 17*b* shown in FIG. 8. Accordingly, it has been found from the test results that the brace portions 17*a*, 17*b* contribute to the improvement of the torsional rigidity greatly.

Features of Present Embodiment (1)

According to the lower vehicle-body structure of the vehicle of the present embodiment, the outer-side reinforcing member 13 and the inner-side reinforcing member 14 are provided inside the side sill 2. Further, the outer-side reinforcing member 13 comprises the engaging portion 18 which is configured to engage with the engaged portion 15 of the inner-side reinforcing member 14 in the vehicle side collision, i.e., when the collision load applied from the vehicle side is inputted to the side sill 2, and the brace portions 17*a*, 17*b*. The brace portion 17*a* interconnects the outer vertical-wall portion 11*a* and the outer top-plate portion 11*b*, straddling the ridgeline 11*f* of the side sill 2, and the brace portion 17*b* interconnects the outer vertical-wall portion 11*a* and the outer bottom-plate portion 11*c*, straddling the ridgeline 11*g* of the side sill 2.

Herein, either one of the brace portions 17*a*, 17*b* may be omitted.

According to the present embodiment, since the angle changes of the ridgelines 11*f*, 11*g* (e.g., the change of the angle of the corner portions of the closed-cross section C such that the angle is opened or closed) are suppressed by the brace portions 17*a*, 17*b*, the engaging portion 18 of the outer-side reinforcing member 13 is suppressed from being shifted in the vertical direction Z in the vehicle side collision. Accordingly, the engaging portion 18 of the outer-side reinforcing member 13 engages with the engaged portion 15 of the inner-side reinforcing member 14 more stably, so that the outer-side reinforcing member 13 and the inner-side reinforcing member 14 can be sufficiently compressed and deformed. Thereby, the energy-absorption quantity can be improved properly.

Accordingly, in a case where the structure of the present embodiment is applied to an electric automobile having battery cells provided below a vehicle floor, the energy absorption of the side sill 2 is so improved that a cell pack can be protected properly.

Further, since the angle change of the ridgelines 11*f*, 11*g* can be suppressed by the brace portions 17*a*, 17*b* in the normal vehicle traveling, the vehicle-body rigidity (particularly, the torsional rigidity) can be improved as well. Thereby, the torsional deformation of the side sill 2 can be suppressed.

Moreover, even if the outer-side reinforcing member 13 and the inner-side reinforcing member 14 are provided inside the side sill 2 in a state where they contact each other inside the closed-cross section C, since the slight angle change of the side sill 2 is not generated in the normal vehicle traveling and also the vertical move (shift) of the outer-side reinforcing member 13 according to this change does not occur. Consequently, the noise is not caused improperly.

(2)

In the lower vehicle-body structure of the vehicle of the present embodiment, one of the engaging portion 18 and the engaged portion 15 has the convex-shaped cross section and extends in the longitudinal direction X and the other has the concave-shaped cross section, which corresponds to the convex-shaped cross section, and extends in the longitudinal direction X.

According to this structure, the engaging portion 18 and the engaged portion 15 can stably engage with each other through their concave-and-convex portions (i.e., a groove and a protrusion) which extend in the longitudinal direction X, respectively. Further, by roll-forming the metal plate, either one of the engaging portion 18 and the engaged portion 15 can be formed in a shape where it has the convex-shaped cross section and continuously extends in the longitudinal direction X and the other one can be formed in a shape where it has the concave-shaped cross section and continuously extends in the longitudinal direction X. Thus, their stable engagement can be easily attained.

(3)

In the lower vehicle-body structure of the vehicle of the present embodiment, the outer-side reinforcing member 13 includes the first portion 16 which has the engaging portion 18 and the second portion 17 which is connected to the first portion 16 and has the brace portions 17*a*, 17*b*.

According to this structure, the first portion 16 with the engaging portion 18 and the second portion 17 with the brace portions 17*a*, 17*b* can be separately formed in their respective shapes having their desired and continuous cross sections through the respective roll-forming of the metal plates. Then, by connecting the first portion 16 and the second portion 17, the outer-side reinforcing member 13 provided with the engaging portion 18 and the brace portions 17*a*, 17*b* can be easily manufactured.

(4)

In the lower vehicle-body structure of the vehicle of the present embodiment, the first portion 16 is fixed to the side sill 2 via the second portion 17.

According to this structure, the collision load inputted to the side sill 2 in the vehicle side collision can be securely transmitted to the first portion 16 via the second portion 17 at the outer-side reinforcing member 13. Thereby, the load transmission from the brace portions 17*a*, 17*b* of the second portion 17 to the engaging portion 18 of the first portion 16 can be attained smoothly.

(5)

In the lower vehicle-body structure of the vehicle of the present embodiment, the first portion 16 comprises the upper wall portion 16*b* which connects the tip end face 16*a* of the engaging portion 18 to the brace portions 17*a*, 17*b* of the second portion 17 and the lower wall portion 16*c* which is located below the upper wall portion 16*b*. The upper wall portion 16*b* and the lower wall portion 16*c* have the step portions 16*f*, 16*g* (i.e., beads or recess-and-convex portions extending in the longitudinal direction X) as the deformation promotion to promote deformation partially in the vehicle side collision.

According to this structure, in the vehicle side collision, the engaging portion 18 of the first portion 16 of the outer-side reinforcing member 13 engages with the engaged portion 15 of the inner-side reinforcing member 14 and also the partial deformation of the first portion 16 of the outer-side reinforcing member 13 is promoted at each of the step portions 16*f*, 16*g* as the deformation-promotion portions of the upper wall portion 16*b* and the lower wall portion 16*c*. Consequently, the energy-absorption quantity of the outer-side reinforcing member 13 can be further improved.

(6)

In the lower vehicle-body structure of the vehicle of the present embodiment, the first portion 16 is made of the plate member. The deformation promotion portion is constituted by the plural step portions 16*f*, 16*g* which are formed by partially bending the plate member.

According to this structure, the deformation promotion portion can be formed at the upper wall portion 16*b* and the lower wall portion 16*c* of the first portion 16 of the outer-side reinforcing member 13 by a simple structure (in other words, by a simple shape changing) by constituting the deformation promotion portion by the plural step portions 16*f*, 16*g*. In the vehicle side collision, the plural step portions 16*f*, 16*g* are deformed in a folding manner (so-called bellows manner), so that the first portion 16 of the outer-side reinforcing member 13 can be deformed easily. Moreover, the energy-absorption quantity of the outer-side reinforcing member 13 can be easily set and controlled by a shape of the step portion of the first portion 16.

(7)

In the lower vehicle-body structure of the vehicle of the present embodiment, the above-described upper brace portion 17*a* and the above-described lower brace portion 17*b* are both provided.

According to this structure, the further improvement of the energy-absorption quantity of the side sill 2 in the vehicle side collision and the further improvement of the rigidity of the side sill 2 in the normal vehicle traveling can be attained.

(8)

In the lower vehicle-body structure of the vehicle of the present embodiment, the outer vertical-wall portion 11*a* has the bead 11*h* extending in the longitudinal direction X (the recess portion which is recessed toward the vehicle inside Y2 in FIG. 3), and the brace portions 17*a*, 17*b* are fixed to the bead 11*h*.

According to this structure, since the outer vertical-wall portion 11*a* of the side sill 2 has the bead 11*h* extending in the longitudinal direction X, the rigidity of the outer vertical-wall portion 11*a* (particularly, the bending rigidity in the vehicle width direction) can be improved. Further, since the brace portions 17*a*, 17*b* are fixed to the bead 11*h* which provides the high rigidity, the collision load of the vehicle side collision can be smoothly transmitted to the brace portions 17*a*, 17*b* of the outer-side reinforcing member 13 from the outer vertical-wall portion 11*a* of the side sill outer 11, so that the energy-absorption quantity of the outer-side reinforcing member 13 can be further improved.

(9)

In the lower vehicle-body structure of the vehicle of the present embodiment, the inner-side reinforcing member 14 and the outer-side reinforcing member 13 are made by roll-forming the metal plate.

According to this structure, the desired cross-section shape can be made easily and with low costs. Further, since the both reinforcing members 14, 13 are formed continuously, this structure is applicable to any vehicles with the different vehicle's entire length, i.e., applicable to any vehicle's body sizes.

Further, since the both reinforcing members 14, 13 made by the roll-forming reinforce the side sill 2 over a long range in the longitudinal direction X, even if an obstacle hits against any part, in the longitudinal direction X, of the side sill 2, the superior energy-absorption quantity can be obtained. Thereby, the battery of the battery-electric automobile can be securely protected.

(10)

In the lower vehicle-body structure of the vehicle of the present embodiment, this structure further comprises the four cross members 6-9 (the first cross member 6, the front-side middle cross member 7, the second cross member 8, and the third cross member 9) extending in the vehicle width direction Y, wherein these cross members are connected to the inner vertical-wall portion 12*a* of the side sill inner 12 in a range which includes an overlapping portion of the inner-side reinforcing member 14 and the side sill 2 in the vertical direction Z, like the front-side middle cross member 7 shown in FIG. 3.

According to this structure, the collision load can be effectively received in the vehicle side collision by the cross members 6-9 which support the overlapping portion of the inner-side reinforcing member 14 and the side sill 2 from the vehicle inside. Thereby, the energy-absorption quantity of the side sill 2 and the inner-side reinforcing member 14 can be further improved. Accordingly, in the electric automobile with the battery back provided to extend below the vehicle floor, the battery pack can be protected securely.

Modified Examples

In the above-described embodiment, the step portions 16*f*, 16*g* formed by bending the plate, i.e., the bead or the concave-and-convex portions extending in the longitudinal direction X, are exemplified as the deformation promotion portion provided at the upper wall portions 16*b*, 16*c* of the first portion 16 of the outer-side reinforcing member 13. However, the present invention is not limited to this, and any shape or type of deformation promotion portion is applicable to the present invention as long as the deformation of the upper wall portion 16*b* and the lower wall portion 16*c* can be promoted. For example, a notch may be formed at the upper wall portion 16*b* and the lower wall portion 16*c*, or the thickness of these may be reduced partially.

The present invention is applicable to any vehicle with the side sill. In particular, in a case where the present invention is applied to the electric automobile with the battery pack provided below the vehicle floor, the energy absorption of the side sill is so improved that the battery pack can be protected properly.

What is claimed is:

1. A lower vehicle-body structure of a vehicle, comprising:

a side sill having a closed-cross section and extending in a longitudinal direction of the vehicle;

an outer-side reinforcing member arranged inside the side sill and extending in the longitudinal direction; and an inner-side reinforcing member arranged on a vehicle inside of the outer-side reinforcing member inside the side sill and extending in the longitudinal direction, wherein said side sill comprises an outer vertical-wall portion, an inner vertical-wall portion positioned on the vehicle inside of said outer vertical-wall portion, an outer top-plate portion connected to an upper end of said outer vertical-wall portion, and an outer bottom-plate portion connected to a lower end of outer vertical-wall portion, said outer vertical-wall portion, said inner vertical-wall portion, said outer top-plate portion and said outer bottom-plate portion form together at least part of said closed-cross section of the side sill, an upper ridgeline is formed between said outer vertical-wall portion and said outer top-plate portion and a lower ridgeling is formed between said outer vertical-wall portion and said outer bottom-plate portion, said inner-side reinforcing member comprises an engaged portion which is fixed to said inner vertical-wall portion and configured to engage with said outer-side reinforcing member when an collision load applied from a vehicle side is inputted to the side sill, and said outer-side reinforcing member comprises an engaging portion which is configured to engage with said engaged portion of the inner-side reinforcing member when the collision load applied from the vehicle side is inputted to the side sill and at least one of an upper brace portion which interconnects said outer vertical-wall portion and said outer top-plate portion, straddling said upper ridgeline, and a lower brace portion which interconnects said outer vertical-wall portion and said outer bottom-plate portion, straddling said lower ridgeline.

2. The lower vehicle-body structure of the vehicle of claim 1, wherein one of said engaging portion and said engaged portion has a convex-shaped cross section and extends in the longitudinal direction and the other has a concave-shaped cross section, which corresponds to said convex-shaped cross section, and extends in the longitudinal direction.

3. The lower vehicle-body structure of the vehicle of claim 1, wherein said outer-side reinforcing member includes a first portion which has said engaging portion and a second portion which is connected to said first portion and has said brace portion.

4. The lower vehicle-body structure of the vehicle of claim 2, wherein said outer-side reinforcing member includes a first portion which has said engaging portion and a second portion which is connected to said first portion and has said brace portion.

5. The lower vehicle-body structure of the vehicle of claim 3, wherein said first portion is fixed to said side sill via said second portion.

6. The lower vehicle-body structure of the vehicle of claim 4, wherein said first portion is fixed to said side sill via said second portion.

7. The lower vehicle-body structure of the vehicle of claim 3, wherein said first portion comprises an upper wall portion which connects said engaging portion to said second portion and a lower wall portion which is located below said upper wall portion and connects said engaging portion to said second portion, and each of said upper wall portion and said lower wall portion has a deformation-promotion portion to promote deformation partially in a vehicle side collision.

8. The lower vehicle-body structure of the vehicle of claim 4, wherein said first portion comprises an upper wall portion which connects said engaging portion to said second portion and a lower wall portion which is located below said upper wall portion and connects said engaging portion to said second portion, and each of said upper wall portion and said lower wall portion has a deformation-promotion portion to promote deformation partially in a vehicle side collision.

9. The lower vehicle-body structure of the vehicle of claim 7, wherein said first portion is made of a plate member, and said deformation promotion portion is constituted by plural step portions which are formed by partially bending said plate member.

10. The lower vehicle-body structure of the vehicle of claim 8, wherein said first portion is made of a plate member, and said deformation promotion portion is constituted by plural step portions which are formed by partially bending said plate member.

11. The lower vehicle-body structure of the vehicle of claim 1, wherein said upper brace portion and said lower brace portion are both provided.

12. The lower vehicle-body structure of the vehicle of claim 2, wherein said upper brace portion and said lower brace portion are both provided.

13. The lower vehicle-body structure of the vehicle of claim 1, wherein said outer vertical-wall portion has a bead extending in the longitudinal direction, and said brace portion is fixed to said bead.

14. The lower vehicle-body structure of the vehicle of claim 2, wherein said outer vertical-wall portion has a bead extending in the longitudinal direction, and said brace portion is fixed to said bead.

15. The lower vehicle-body structure of the vehicle of claim 1, wherein said inner-side reinforcing member and said outer-side reinforcing member are made by roll-forming a metal plate.

16. The lower vehicle-body structure of the vehicle of claim 2, wherein said inner-side reinforcing member and said outer-side reinforcing member are made by roll-forming a metal plate.

17. The lower vehicle-body structure of the vehicle of claim 1, further comprising a cross member extending in a vehicle width direction, wherein said cross member is connected to said inner vertical-wall portion of the side sill in a range which includes an overlapping portion of said inner-side reinforcing member and said side sill in a vertical direction.

18. The lower vehicle-body structure of the vehicle of claim 2, further comprising a cross member extending in a vehicle width direction, wherein said cross member is connected to said inner vertical-wall portion of the side sill in a range which includes an overlapping portion of said inner-side reinforcing member and said side sill in a vertical direction.

* * * * *